2,907,632

PRODUCTION OF TITANIUM TETRAIODIDE

Myles S. Maxim, Dayton, Ohio, assignor to Monsanto Chemical Company, St. Louis, Mo., a corporation of Delaware No Drawing. Application August 24, 1955
Serial No. 530,394

8 Claims. (Cl. 23—87)

This invention relates to an improved method for making titanium tetraiodide.

It has now been found that titanium tetraiodide can be produced by the reaction of hydrogen iodide with titanium tetrachloride in excess titanium tetrachloride utilized as a solvent. Contrary to expectation and prior art suggestions, the titanium tetraiodide can be separated from the titanium tetrachloride solution in substantially quantitative yields without contamination or interference from the mixed halides, i.e., $TiCl_3I$, $TiCl_2I_2$, and $TiClI_3$.

The reaction of the present invention can be conveniently carried out by bubbling gaseous hydrogen iodide into liquid titanium tetrachloride in amounts such that the atomic ratio of iodine to titanium in the solution never reaches or exceeds 4, and preferably never exceeds about 3. In a batch operation, this ratio can be controlled by stopping the addition of hydrogen iodide prior to conversion of all of the titanium tetrachloride to titanium tetraiodide. In a continuous process the ratio can be controlled by introducing both hydrogen iodide and titanium tetrachloride at a mole ratio of 4:1 into titanium tetrachloride and removing only the product (titanium tetraiodide) and the by-product hydrogen chloride. In this way, there will be a continual excess of titanium tetrachloride present at all times. Another way to carry out the process continuously is by passing liquid titanium tetrachloride downwardly through a column (e.g., a wetted wall, packed, bubble cap, etc.) and gaseous hydrogen iodide upwardly through the column in counter-current contact with the titanium tetrachloride. The relative rates of introduction of titanium tetrachloride and hydrogen iodide are controlled so that not all of the titanium tetrachloride reacts with hydrogen iodide, thereby leaving a titanium tetrachloride solution of titanium halides leaving the bottom of the column.

The reaction of hydrogen iodide and titanium tetrachloride is quite rapid, even at temperatures as low as −25° C. The reaction is most conveniently carried out at around room temperature, i.e., between about 10° C. and about 40° C. and preferably between about 20° C. and about 30° C. However, higher reaction temperatures can be utilized equally well, especially if the reaction system is pressurized to reduce vapor losses of titanium tetrachloride, or if other provisions are made for the recovery of such vapors. The reaction is exothermic, so means must be provided for withdrawing heat from the reaction mixture if the temperature is going to be maintained below any predetermined level.

The reaction mixture resulting from the above-described reaction will be either a homogeneous solution, or a heterogeneous slurry of solid, in liquid titanium tetrachloride—depending upon the temperature and relative quantities of iodide and chloride in the final mixture. For example, at 25° C. reaction products having iodide-to-chloride atomic ratios up to about 0.725 will be homogeneous liquids, while higher ratios will result in a solid phase of $TiI_4$. At 100° C., products having iodide-to-chloride atomic ratios up to about 2.7 will be homogeneous liquids, with higher ratios giving the solid $TiI_4$. The titanium tetraiodide product can be separated from the reaction mixture by crystallization of titanium tetraiodide followed by decantation, filtration and/or evaporation of the liquid tetrachloride from the crystalline solid. Alternatively, the tetraiodide can be recovered by a liquid-vapor separation, e.g., fractional distillation. In the former case, titanium tetraiodide is obtained as a substantially pure crystalline product uncontaminated by the mixed halides. In the latter case, the tetraiodide is first obtained as a pure liquid bottoms product after distilling off the tetrachloride. The tetrachloride is most readily distilled from the tetraiodide at temperatures in excess of about 135° C. The bottom product (tetraiodide) is preferably carried to a temperature of 200° C. or higher in order to minimize contamination with the mixed halide salts. The liquid tetraiodide will crystallize on cooling to room temperature.

The following examples will serve to illustrate the present invention:

*Example 1*

Gaseous hydrogen iodide was bubbled through one mole (189.7g.) of titanium tetrachloride for about 2½ hours during which time 1.39 moles of the hydrogen iodide had reacted with the titanium tetrachloride replacing chlorine atoms with iodine atoms. The reaction mixture was maintained at 25° C. ±2° C. At the end of the reaction period, the reaction mixture was a liquid solution. The mixture was cooled to 15° C. at which temperature crystalline titanium tetraiodide precipitated from solution and settled rapidly to the bottom of the flask. The resulting slurry was stirred for about ½ hour and filtered, and the wet crystalline product dried by pumping under a vacuum at about 25° C. to give 50 grams of substantially pure crystalline titanium tetraiodide.

*Example 2*

The filtrate obtained as described in Example 1 above was distilled until no more overhead product was obtained at 350° C. (reboiler temperature). At this point 85.5 grams of distillate (boiling point about 137° C.) had been taken overhead. There remained as the bottom product 174 grams of titanium tetraiodide, melting 148–150° C. and analyzing only 0.18 percent chlorine.

I claim:

1. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said excess titanium tetrachloride.

2. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said excess titanium tetrachloride by precipitating crystalline titanium tetraiodide under conditions of concentration and temperature such that the amount of titanium tetraiodide exceeds the solubility of said tetraiodide in said tetrachloride.

3. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said excess titanium tetrachloride by first cooling to crystallize titanium tetraiodide and thereafter evaporating said tetrachloride from said crystalline tetraiodide.

4. The method of making titanium tetraiodide, which method comprises continuously introducing 4 molecular proportions of hydrogen iodide and 1 molecular proportion of liquid titanium tetrachloride into a titanium tetrachloride solution saturated with respect to titanium tetraiodide while maintaining the temperature of said solution substantially constant, thereby continuously precipitating crystalline titanium tetraiodide from said solution.

5. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said tetrachloride by evaporation of the tetrachloride therefrom.

6. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said tetrachloride by evaporating the tetrachloride at a temperature above the boiling point of said tetrachloride.

7. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said tetrachloride by evaporating the tetrachloride at a temperature above the melting point of said tetraiodide.

8. The method of making titanium tetraiodide, which method comprises continuously reacting 4 molecular proportions of hydrogen iodide with 1 molecular proportion of liquid titanium tetrachloride in a substantial excess of liquid titanium tetrachloride and continuously separating the product titanium tetraiodide from said tetrachloride by fractional distillation.

References Cited in the file of this patent

UNITED STATES PATENTS

| | | |
|---|---|---|
| 2,519,385 | Loonam | Aug. 22, 1950 |
| 2,550,447 | Blumenthal | Aug. 24, 1951 |

OTHER REFERENCES

Bulletin de la Societé Chimque de Paris-Nouvelle Serie, tome 7 (1867), pages 201–202, published by Librairie de L. Hachette et cie Paris, France.

"Titanium," by Jelks Barksdale, 1949 ed., page 85, The Ronald Press Co., N.Y.

J. W. Mellor's "A Comprehensive Treatise on Inorganic Chem.," vol. 7, 1928 ed., page 89, Longmans, Green and Co., N.Y.